Jan. 13, 1942.  H. M. DANKER  2,270,000
BELT ADJUSTING DEVICE
Filed May 10, 1940

Inventor:
Hugo M. Danker
By Milo B. Stevenot & Co.
Attys.

Patented Jan. 13, 1942

2,270,000

UNITED STATES PATENT OFFICE 2,270,000

BELT ADJUSTING DEVICE

Hugo M. Danker, Oak Park, Ill.

Application May 10, 1940, Serial No. 334,458

4 Claims. (Cl. 74—242.10)

My invention relates to devices for taking up slack in conveyor belts, and more particularly to adjusting devices which are adaptable to wide belts, and my main object is to provide a device of this kind which adjusts the belt runs uniformly along their entire width.

A further object of the invention is to design the novel device compactly whereby to locate it entirely between the belt runs.

Another object of the invention is to construct the device along lines of simplicity and in a manner to be easily handled or operated.

With the above objects in view and any others which may suggest themselves from the description to follow, a better understanding of the invention may be had by reference to the accompanying drawing, in which—

Figure 1:
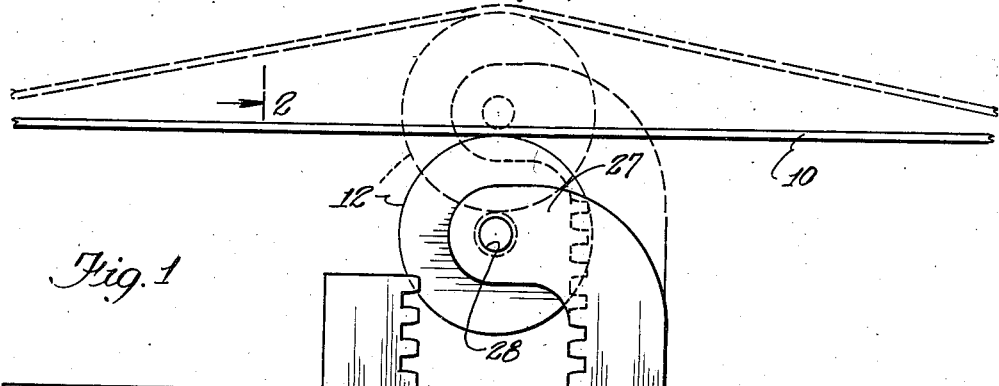
Fig. 1 is a side elevation of a portion of a conveyor belt, showing the novel adjusting device applied thereto.
Figure 2:
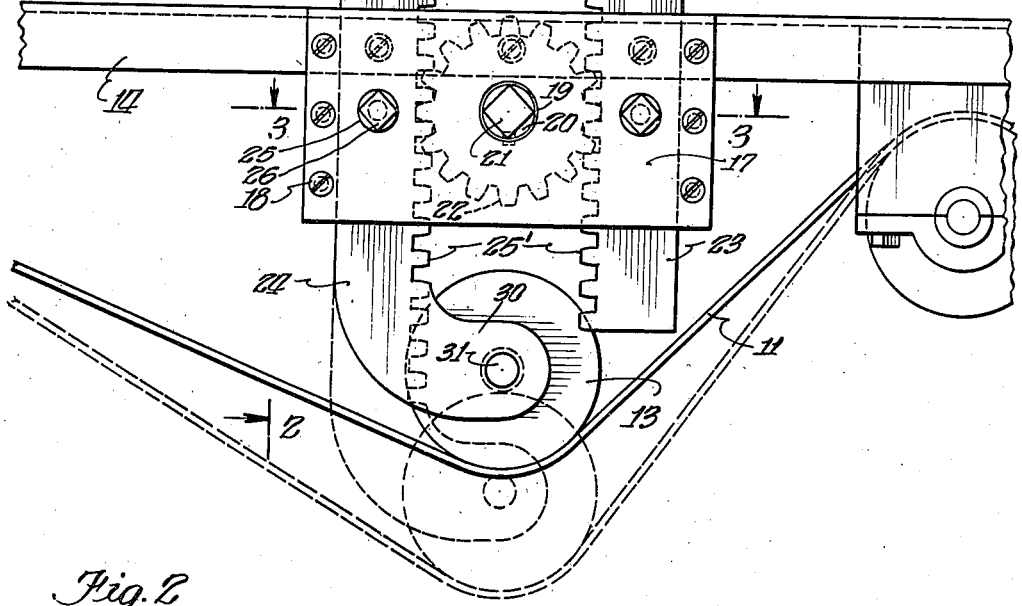
Fig. 2 is a section on the line 2—2 of Fig. 1, on a reduced scale.
Figure 3:
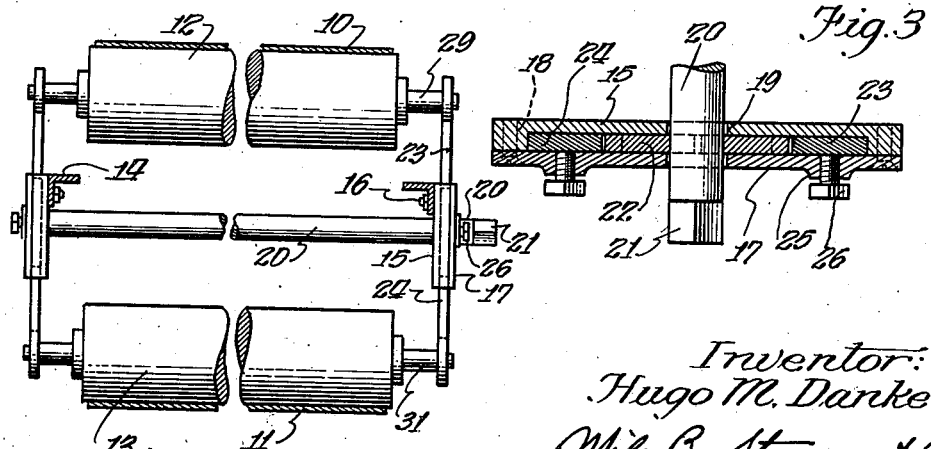
Fig. 3 is a section on the line 3—3 of Fig. 1.

Devices for adjusting or taking up slack in belts usually apply only to one of the belt runs and without particular regard to leveling the belt, since most belts are not very wide. However, in the case of conveyor belts which are wide, the leveling factor becomes important in respect to the material conveyed, and it is therefore imperative that an adjusting device does not operate to the prejudice of the belt level. I have had this condition in mind while developing the present invention, and have in fact designed the same to help maintain the proper level of the belt irrespective of its width.

In accordance with the foregoing specific reference to the drawing indicates the upper run of a typical conveyor belt at 10, and the lower run at 11. Usually, a belt of this kind runs along a substantially horizontal course at the top in order to convey articles or loose materials safely; the slack in the belt is therefore taken out by creating an offset in the lower run, an idler being used for this purpose. In the present embodiment I employ an idler both below the upper run 10 and above the lower run 11. The idlers for conveyor belt purposes are necessarily long cylindrical rollers 12 and 13, the roller 12 serving as a support for the upper run in the zone of the adjusting device, while the roller 13 procures the offset in the belt to take out its slack.

In order to mount the idler rollers 12 and 13 in their proper places, a pair of longitudinal angle frame bars 14 extending between the belt runs is preferably employed as supports for the adjusting device. Each frame bar receives a vertical housing 15 on its outer side, the housing being secured to the frame bar by bolts 16. The housing opens outwardly and receives a closure plate 17 secured to the housing by screws 18.

The housings are identical in construction and placed opposite to each other. They are perforated in the center as indicated at 19 to journal a cross shaft 20, one end of the shaft projecting from the related housing is squared off as indicated at 21 for the application of a socket wrench when the shaft 20 is to be rotated.

Inside each housing 15 the shaft 20 carries a rigidly mounted spur gear 22. Two rack bars 23 and 24 are vertically slidable in the ends of the housing and with their teeth 25' in mesh with the gear 22 on opposite sides. The closure plate 17 is thickened as indicated opposite the rack bars 23 to provide tapped receptacles 25 for set screws 26 which may be advanced to lock the rack bars at any point in their sliding movements. The rack bars 23 are formed with inward top sections 27 which are perforated at 28 to form journals for the end portions of a spindle 29 carried by the idler roller 12. The rack bars 24 have inward bottom sections 30 similarly receiving the end portions of a spindle 31 carried by the lower idler roller 13.

With the parts arranged as described, the device may be adjusted to impose a separating influence on the belt runs to any suitable extent, such as indicated by dotted lines in Fig. 1. This is done by first loosening the set screws 26, and then applying the socket wrench to the end 21 of the medial shaft 20, the wrench being rotated in a manner to separate the rack bars 23. The influence of these equally affects the belt runs, as suggested by the dotted lines. Where the device is used with a conveyor belt, as here, or where it is otherwise desired that one run of the belt be tightened more than the other, the medial shaft 20 is located, as shown, nearer the run which is to receive the greater tensioning, whereby that run, the lower run here, is initially tensioned by its idler 13 before any tension is applied to the upper run by the other idler. This effect can be secured, also, by removing the closure plate 17 and pre-setting the lower rack bar 24 with respect to the intermediate gear 22.

It will be evident from the above description that the provision of identical adjusting units at the side portions of the belt, and inducing the identical operation of such units by the master shaft 20, will create a uniform and balanced influence on the belt at all points along its width. The provision of the full length idler rollers 12 and 13 assures an even support and pressure on the belt runs; and supporting the adjusting units from the frame bars 14 insures the horizontal positions of the idler rollers 12 and 13 at all times. The novel adjusting device is therefore balanced in its influence, is in itself adjustable to vary the influence on either belt run, is fully positive in its action, is easily operable, may be permanently fixed by the set screws 26, is fully contained between the belt runs, and is of simple and inexpensive construction.

While I have described the invention along specific lines, various minor changes and refinements may be made without departing from its principle, and I desire to consider all such changes and refinements as coming within the scope and spirit of the appended claims.

I claim:

1. An adjusting device for the upper and lower runs of a belt, comprising at least one support between the runs, at least one housing carried by said support, a gear rotatable in said housing, a pair of vertical racks in said housing engageable with opposite sides of said gear for simultaneous actuation thereby in opposite directions, anti-friction means on the upper end of one rack for engagement with the upper run of said belt, like anti-friction means on the lower end of the other rack for engagement with the lower run of said belt, a closure plate for one side of said housing, said plate including means maintaining said racks in operative engagement with said gear, and said closure plate being readily removable to permit individual removal of each rack and presetting thereof with respect to its belt run.

2. The structure of claim 1, and means for locking both of said racks in an adjusted position.

3. The structure of claim 1, a pair of set screws threaded through said closure plate and each set screw engageable with one of said racks to lock the same in adjusted position.

4. The structure of claim 1, the upper end of said first rack and the lower end of said second rack being offset in opposite directions to locate both of said anti-friction means in vertical alignment with said gear.

HUGO M. DANKER.